(12) United States Patent
Wichmann et al.

(10) Patent No.: US 8,726,628 B2
(45) Date of Patent: May 20, 2014

(54) COMBINED CYCLE POWER PLANT INCLUDING A CARBON DIOXIDE COLLECTION SYSTEM

(75) Inventors: Lisa Anne Wichmann, Simpsonville, SC (US); Samuel David Draper, Simpsonville, SC (US); Gilbert Otto Kraemer, Greer, SC (US); Alan Meier Truesdale, Greenville, SC (US); James Anthony West, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 804 days.

(21) Appl. No.: 12/910,571

(22) Filed: Oct. 22, 2010

(65) Prior Publication Data

US 2012/0096870 A1   Apr. 26, 2012

(51) Int. Cl.
*F02C 6/08* (2006.01)
*F02C 6/18* (2006.01)

(52) U.S. Cl.
USPC ............ 60/39.5; 60/39.52; 60/782; 60/785

(58) Field of Classification Search
USPC ................. 60/39.5–39.52, 782–785, 806
See application file for complete search history.

(56) References Cited

U.S. PATENT DOCUMENTS

| | | | |
|---|---|---|---|
| 1,884,991 A | 10/1932 | Gerdts | |
| 3,728,848 A | 4/1973 | Vest, Jr. | |
| 4,936,740 A | 6/1990 | Blotenberg | |
| 5,309,707 A | 5/1994 | Provol et al. | |
| 5,467,608 A | 11/1995 | Cording et al. | |
| 5,794,431 A | 8/1998 | Utamura et al. | |
| 6,202,400 B1 | 3/2001 | Utamura et al. | |
| 6,598,402 B2 | 7/2003 | Kataoka et al. | |
| 7,194,986 B2 | 3/2007 | Strauss | |
| 7,581,401 B2 * | 9/2009 | West et al. | 60/772 |
| 8,397,482 B2 * | 3/2013 | Kraemer et al. | 60/39.52 |
| 2002/0129608 A1 * | 9/2002 | Anand et al. | 60/772 |
| 2008/0010967 A1 * | 1/2008 | Griffin et al. | 60/39.182 |
| 2008/0092549 A1 * | 4/2008 | Reale et al. | 60/782 |
| 2008/0104958 A1 * | 5/2008 | Finkenrath et al. | 60/605.2 |
| 2008/0309087 A1 * | 12/2008 | Evulet et al. | 290/52 |
| 2009/0199566 A1 * | 8/2009 | Lebas et al. | 60/772 |
| 2010/0018218 A1 * | 1/2010 | Riley et al. | 60/783 |

FOREIGN PATENT DOCUMENTS

| | | |
|---|---|---|
| EP | 0294550 B1 | 12/1988 |
| EP | 0663517 A1 | 7/1995 |
| EP | 2060752 A1 | 5/2009 |

\* cited by examiner

*Primary Examiner* — Andrew Nguyen
(74) *Attorney, Agent, or Firm* — Cantor Colburn LLP

(57) ABSTRACT

A combined cycle power plant includes a compressor section including a compressor inlet and a compressor outlet, and a turbine section operatively connected to the compressor section. The turbine section includes a turbine inlet and a turbine outlet. A heat recovery steam generator (HRSG) is fluidly connected to the turbine outlet. A combustor includes a head end and a combustor discharge. The head end is fluidly connected to the compressor outlet and the combustor discharge is fluidly connected to the turbine inlet. A carbon dioxide collection system is fluidly connected to one of the compressor outlet and the head end of the combustor. The carbon dioxide collection system is configured and disposed to extract a first fluid comprising carbon dioxide and a second fluid from a substantially oxygen free fluid flow passed from the one of the compressor outlet and the head end of the combustor.

12 Claims, 2 Drawing Sheets

US 8,726,628 B2

COMBINED CYCLE POWER PLANT INCLUDING A CARBON DIOXIDE COLLECTION SYSTEM

BACKGROUND OF THE INVENTION

The subject matter disclosed herein relates to combined cycle power plants and, more particularly, to a combined cycle power plant including a carbon dioxide collection system.

In a combined cycle power plant (CCPP), a gas turbomachine drives a generator, which produces electricity. Waste heat from the gas turbomachine is used to generate steam in a heat recovery steam generator (HRSG), which, in turn, is used to generate additional electricity via a steam turbomachine. More specifically, a combined cycle is characteristic of a power producing engine or plant that employs more than one thermodynamic cycle. Heat engines, such as gas turbomachines, are only able to use a portion of the energy their fuel generates (usually less than 50%). Any remaining heat (e.g. hot exhaust fumes) from combustion is generally wasted. Combining two or more "cycles" such as a Brayton cycle (Gas) and a Rankine Cycle (Steam) results in improved output efficiency.

BRIEF DESCRIPTION OF THE INVENTION

According to one aspect of the invention, a combined cycle power plant includes a compressor section including a compressor inlet and a compressor outlet, and a turbine section operatively connected to the compressor section. The turbine section includes a turbine inlet and a turbine outlet. A heat recovery steam generator (HRSG) is fluidly connected to the turbine outlet. A combustor includes a head end and a combustor discharge. The head end is fluidly connected to the compressor outlet and the combustor discharge is fluidly connected to the turbine inlet. A carbon dioxide collection system is fluidly connected to at least one of the compressor outlet and the head end of the combustor. The carbon dioxide collection system is configured and disposed to extract a first fluid comprising carbon dioxide and a second fluid from a substantially oxygen free fluid flow passed from the at least one of the compressor outlet and the head end of the combustor.

According to another aspect of the invention, a method of operating a combined cycle power plant includes passing a fluid flow through a compressor section to form a compressed fluid flow, guiding the compressed fluid flow from a compressor outlet to a head end of a combustor, directing combustion gases formed in the combustor to an inlet of a turbine section, exhausting exhaust gases from an outlet of the turbine section to a heat recovery steam generator, passing a substantially oxygen free portion of the compressed fluid flow from one of the compressor outlet and the head end of the combustor to a carbon dioxide collection system, and extracting a first fluid comprising carbon dioxide and a second fluid from the substantially oxygen free portion of the compressed airflow.

According to yet another aspect of the invention, a turbomachine system includes a compressor section having a compressor inlet and a compressor outlet and a turbine section operatively connected to the compressor section. The turbine section includes a turbine inlet and a turbine outlet. A combustor includes a head end and a combustor discharge. The head end is fluidly connected to the compressor outlet and the combustor discharge is fluidly connected to the turbine inlet. A carbon dioxide collection system is fluidly connected to at least one of the compressor outlet and the head end of the combustor, the carbon dioxide collection system is configured and disposed to extract a first fluid comprising carbon dioxide and a second fluid from a substantially oxygen free fluid flow passed from the at least one of the compressor outlet and the head end of the combustor.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
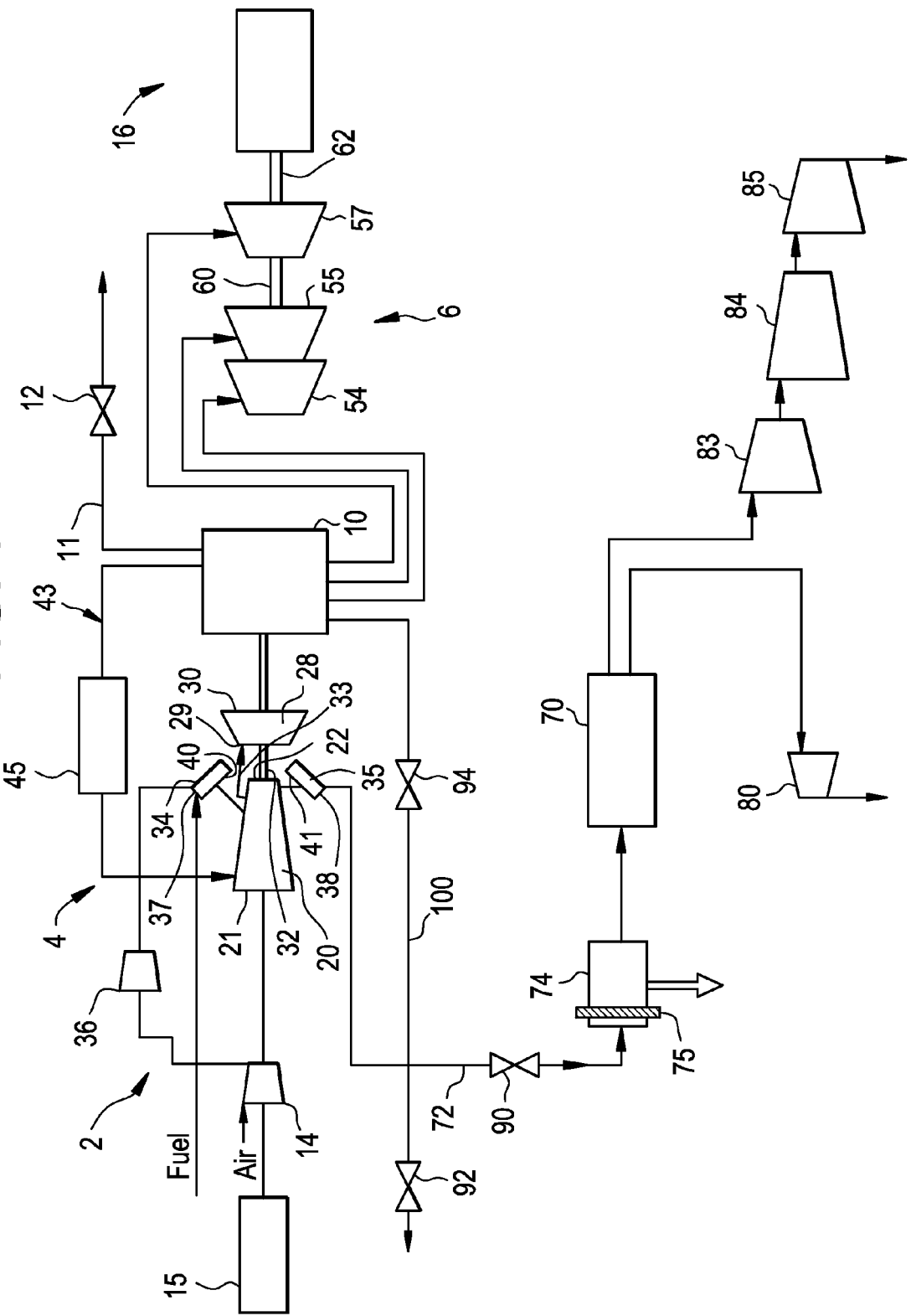
FIG. 1 is a block diagram illustrating a combined cycle power plant including a carbon dioxide collection system in accordance with an exemplary embodiment.

In accordance with an exemplary embodiment, a combined cycle power plant (CCPP) 2 shown in FIG. 1 can be operated under or near stoichiometric conditions. Operation under stoichiometric conditions should be understood to mean running a combustion process with only enough oxidizer, for example oxygen, to promote complete combustion. Combustion is a process of burning a hydrocarbon (fuel stream) with oxygen to produce carbon dioxide and water. Complete combustion is defined as carbon dioxide and water being the only byproducts produced from a hydrocarbon burning with oxygen. There are many factors that influence whether or not complete combustion occurs, such as the availability of oxygen in proximity to a fuel molecule, whether or not there are any upsets such as vibrations, dynamic events, shock waves, and the like. In order to promote carbon dioxide formation rather than carbon monoxide formation, more oxygen than what is normally required is fed into the fuel stream to promote a complete combustion reaction.

CCPP 2 includes a gas turbomachine system 4 operatively connected to a steam turbomachine system 6 through a heat recovery steam generator (HRSG) 10. HRSG 10 includes an exhaust portion 11 having a blow-off vent 12. Gas turbomachine 4 is also operatively coupled to an off-board compressor 14 and to a generator 15. Steam turbomachine system 6 is coupled to a generator 16. Gas turbomachine system 4 includes a compressor section 20 having a compressor inlet 21 and a compressor outlet 22. Compressor inlet 21 receives a pressurized airflow from off-board compressor 14. Compressor section 20 further compresses the pressurized airflow passing into compressor inlet 21 and discharges a compressed fluid flow through compressor outlet 22. Gas turbomachine system 4 also includes a turbine section 28 having a turbine inlet 29 that receives a portion of the compressed fluid flow for cooling and sealing and a turbine outlet 30. Compressor section 20 is operatively connected to turbine section 28 through a shaft 32. Compressor section 20 is also fluidly connected to turbine section 28 through a secondary flow system 33 that provides additional cooling to turbine section 28 through a plurality of combustors, two of which are indicated at 34 and 35. In the exemplary embodiment shown, combustor 34 receives a pressured airflow from an auxiliary compressor 36 fluidly connected to off-board compressor 14. Each combustor 34, 35 includes a corresponding head end 37 and 38 that receives another portion of the compressed fluid flow from 20, and a corresponding combustor discharge 40 and 41 that passes combustion gases to turbine section 28. CCPP 2 is also shown to include an exhaust gas recirculation (EGR) loop 43 that fluidly connects an EGR system 45 between HRSG 10 and compressor inlet 21. EGR system 45 circulates exhaust gases from HRSG 10 back into compressor section 20 to promote more complete combustion. As further shown in FIG. 1, steam turbomachine system 6 includes a first steam turbine section 54 operatively connected to a second steam turbine section 55. First and second steam turbine sections 54 and 55 are operatively connected to a steam turbine section 57 through a first shaft 60. Of course it should be understood that steam turbine section 57 may also be directly connected to second steam turbine section 55. Steam turbine section 57 may also comprise a dual flow section. A second shaft 62 operatively connects steam turbine section 57 with generator 12.

In further accordance with the exemplary embodiment, CCPP 2 includes a carbon dioxide collection system 70 operatively connected to gas turbomachine system 4 through a conduit 72. A heat exchange member 74 is arranged in conduit 72 between gas turbomachine system 4 and carbon dioxide collection system 70. Heat exchange member 74 includes a CO catalyst 75 that reacts with any remaining carbon monoxide and oxygen to further reduce the $O_2$ levels to trace amounts. In this manner, a substantially oxygen free fluid flow exits heat exchange member 74 and passes to carbon dioxide collection system 70. Heat exchange member 74 also removes a portion of the heat entrained within the substantially oxygen free fluid flow passing to carbon dioxide collection system 70. In accordance with one aspect of the exemplary embodiment, heat exchange member 74 lowers the temperature of the substantially oxygen free fluid flow to about 220° F. (104.4° C.)

In accordance with one aspect of the exemplary embodiment, fluid ingested by compressor inlet 21 is a mixture of exhaust gas and air, with oxygen in the extraction being reduced to a mass fraction of oxygen of less than 18%. In accordance with another aspect of the exemplary embodiment, compressor inlet 21 is closed off to atmosphere and 100% exhaust gas is passed through compressor section 20. With this arrangement, secondary flow system 33 only transports exhaust gases, which are substantially oxygen free, through secondary flow circuits (not shown), around compressor section 20 to turbine section 28. Isolating secondary flow system 33 from ambient ensures that only oxygen enters turbine section 28 by way of off-board compressor 14 and auxiliary compressor 36 via head-ends 37 and 38 of combustors 34 and 35. For a case with near complete combustion, turbine section 28, and, by extension compressor section 20 and the extraction to carbon dioxide collection system 70, is isolated from oxygen. In accordance with this aspect of the exemplary embodiment, oxygen is present in the extraction at less then 2% by volume. In further accordance with the exemplary aspect, exhaust is maintained at a 1:2 ratio of oxygen to carbon monoxide. In this manner, oxygen is reduced to even lower levels by CO catalyst 75 included in the Heat Exchange member (74).

Carbon dioxide collection system 70 separates a first fluid stream including carbon dioxide ($CO_2$), and a second fluid stream containing Nitrogen ($N_2$), Argon (Ar) as well as various other constituents originally entrained in the substantially oxygen free fluid flow from a portion of a fluid flow passing through gas turbomachine system 4. In accordance with one aspect of the exemplary embodiment, the substantially oxygen free fluid flow is extracted from each head end 37, 38 of combustors 34 and 35. In accordance with another aspect of the exemplary embodiment, the fluid flow is extracted at or near compressor outlet 22. Regardless of the extraction location, $CO_2$ is passed from carbon dioxide collection system 70 through a compression member 80, which may include inter-cooling, to form compressed $CO_2$. The compressed $CO_2$ may be used in oil extraction processes, beverage carbonation, or any other process that utilized compressed $CO_2$. The $N_2$, Ar, and various other constituents are passed through a series of compression members 83-85. Compression members 83-85 provide multiple compression steps that are employed to produce a desired temperature of the $N_2$, Ar, and various other constituents at an outlet of compressor 85 such as through the use of inter-cooling.

Carbon dioxide collection system 70 is fluidly connected to gas turbomachine system 4 through a throttling and control valve 90 positioned upstream from heat exchange member 74. Throttling and control valve 90 is selectively positioned between an open position and a closed position to deliver the fluid flow from gas turbomachine system 4 to carbon dioxide collection system 70. In the event that carbon dioxide collection system becomes blocked, or valve 90 is closed, CCPP 2 includes a valve, such as a blow-out valve 92 and a turbine bypass valve 94. Turbine bypass valve 94 is fluidly connected to a bypass conduit 100 that extends between conduit 72 upstream of throttling and control valve 90 and HRSG 10. Bypassing turbine section 28 ensures that the fluid flow does not provide a negative impact on complete combustion and thus shift CCPP 2 away from stoichiometric operation. With this arrangement, in the event that control valve 90 and or turbine bypass valve 94 fail, blow-out valve 92 opens to prevent carbon dioxide extraction system 70 from becoming over-pressured causing a surge to compressor section 20. If turbine bypass valve 94 is open and control valve 90 is closed, e.g., gas turbomachine 4 is operating at 100% exhaust flow, blow-off vent 12 fluidly connected to exhaust portion 11 of HRSG 10 would open to prevent any over pressure condition within EGR loop 43.

Figure 2:
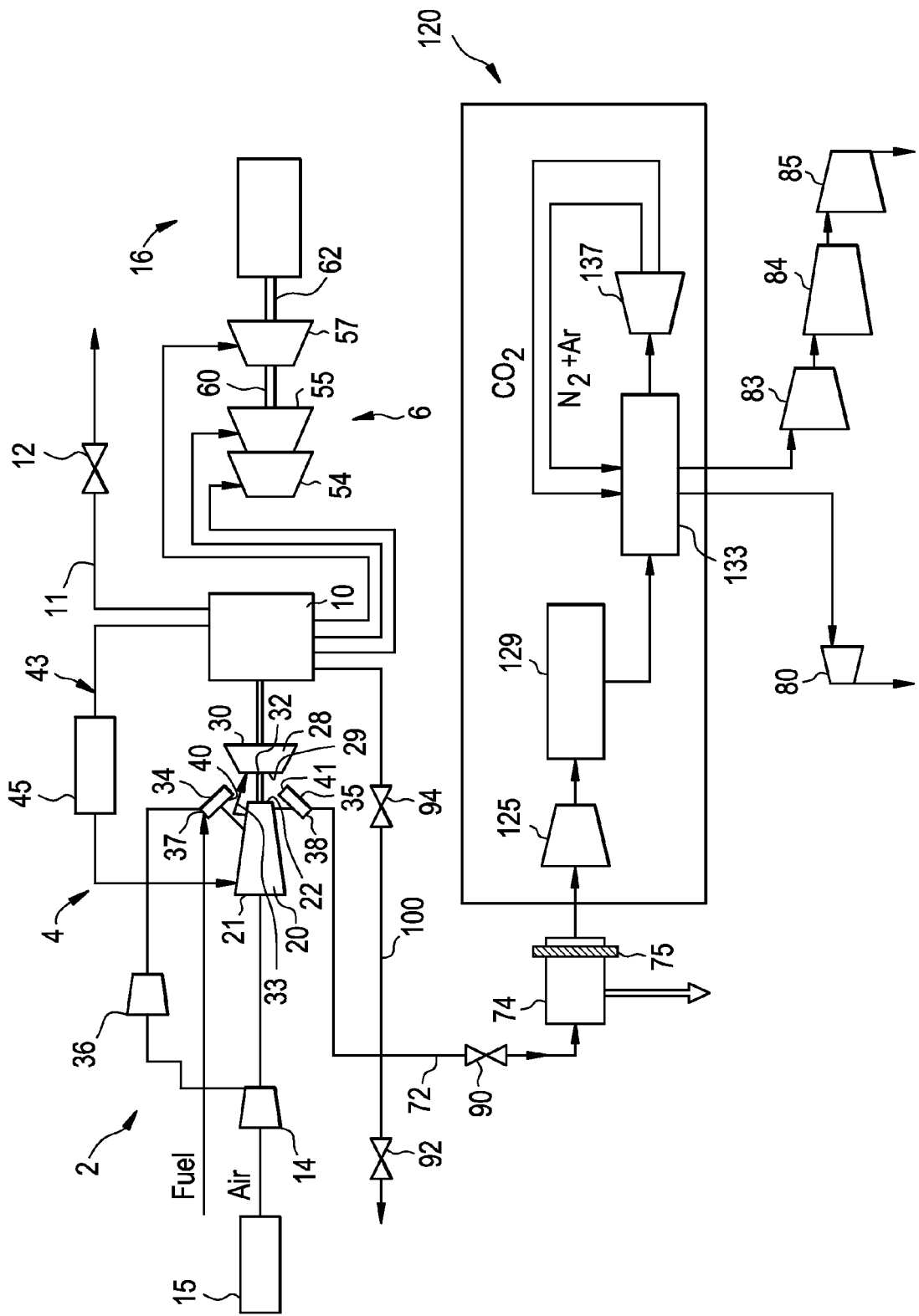
FIG. 2 is a block diagram illustrating a combined cycle power plant including a carbon dioxide collection system in accordance with one aspect of the exemplary embodiment.

Reference will now be made to FIG. 2, wherein like reference numbers represent corresponding parts in the respective views, in describing a carbon dioxide collection system 120 in accordance with one aspect of the exemplary embodiment. Carbon dioxide collection system 120 includes a Compression member 125 fluidly connected to a refrigerator 129 that further lowers a temperature of the fluid flow passing from gas turbomachine system 4. Refrigerator 129 is fluidly connected to a regenerator or regenerative heat exchanger 133, which lowers a temperature of the fluid between about 25° F. (−3.89° C.) and about −153° F. (−102.78° C.). Regenerator 133 discharges the fluid into an expansion member 137, which further reduces the temperature of the fluid to approximately −200° F. (−128.89° C.), at which point the fluid separates into two streams, a non-gaseous CO2 stream and a gaseous N2/Ar stream. The two separate fluid streams (not separately labeled) return to regenerator 133 to be heated by the flow through regenerator 133 from refrigerator 129 to expansion member 137. At this point, regenerator 133 discharges the fluid as two separate gas streams including a $CO_2$ gas stream, and a $N_2$/Ar gas stream with possibly various other constituents. The $CO_2$ gas stream is passed to compression member 80, while the N₂/Ar gas stream passes through compression members 83-85 where intercooling may or may not be employed.

With this arrangement, the CCPP in accordance with the exemplary embodiment not only produces lower exhaust emissions by virtue of stoichiometric operation, but also provides compressed $CO_2$ and N₂/Ar gas streams that can be utilized in various industries. In the case of oil collection, the CCPP will provide any compressed $CO_2$ and $N_2$ that is necessary for oil extraction. Thus, the CCPP not only provides the necessary power for an oil field but also eliminates the need for additional $CO_2$ and $N_2$ collection and/or storage.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combined cycle power plant comprising:
   a compressor section including a compressor inlet and a compressor outlet;
   a turbine section operatively connected to the compressor section, the turbine section including a turbine inlet and a turbine outlet;
   a heat recovery steam generator (HRSG) fluidly connected to the turbine outlet;
   a combustor including a head end and a combustor discharge, the head end being fluidly connected to the compressor outlet and the combustor discharge being fluidly connected to the turbine inlet;
   a carbon dioxide collection system fluidly connected to at least one of the compressor outlet and the head end of the combustor, the carbon dioxide collection system being configured and disposed to extract a first fluid comprising carbon dioxide and a second fluid from a substantially oxygen free fluid flow passed from the at least one of the compressor outlet and the head end of the combustor; and
   a secondary flow system directly fluidically connecting the compressor portion and the turbine portion, the secondary flow system delivering a substantially oxygen free cooling flow from the compressor portion to the turbine portion;
   an exhaust gas recirculation (EGR) system fluidically connected between the HRSG and the compressor section;
   a heat exchange member fluidically connected between one of the compressor outlet and the head end of the combustor and the carbon dioxide collection system;
   a throttling and control valve fluidically arranged between the one of the compressor outlet and the head end of the combustor and the heat exchange member, the throttling and control valve being configured and disposed to fluidically isolate the heat exchange member from the one of the compressor outlet and the head end of the combustor; and
   a turbine bypass valve fluidically connected to the HRSG configured and disposed to open when the throttling and control valve is closed to substantially prevent an over pressure condition in the EGR system.

2. The combined cycle power plant according to claim 1, wherein the second fluid comprises nitrogen.

3. The combined cycle power plant according to claim 1, wherein the carbon dioxide collection system includes a compression member fluidly connected to an expansion member.

4. The combined cycle power plant according to claim 1, further comprising: a blow-out valve fluidly connected to the turbine bypass valve.

5. The combined cycle power plant according to claim 1, further comprising: a blow-off vent arranged at an exhaust portion of the HRSG.

6. The combined cycle power plant according to claim 1, wherein the carbon dioxide collection system is fluidly connected to the head end of the combustor.

7. The combined cycle power plant according to claim 1, wherein the turbine section is configured and disposed to operate at or near stoichiometric conditions.

8. A method of operating a combined cycle power plant, the method comprising:
   passing a fluid flow through a compressor section to form a compressed fluid flow;
   guiding the compressed fluid flow from a compressor outlet to a head end of a combustor;
   directing combustion gases formed in the combustor to an inlet of a turbine section;
   exhausting a fluid flow from an outlet of the turbine section to a heat recovery steam generator (HRSG);
   passing a substantially oxygen free portion of the compressed fluid flow from one of the compressor outlet and the head end of the combustor to a carbon dioxide collection system;
   extracting a first fluid comprising carbon dioxide and a second fluid from the substantially oxygen free portion of the compressed airflow; and
   passing a secondary substantially oxygen free cooling flow directly from the compressor portion to the turbine portion;
   circulating exhaust gases from the HRSG to the compressor section through an exhaust gas recirculation (EGR) system;
   passing the substantially oxygen free portion of the compressed airflow through a throttle and control valve to the carbon dioxide collection system via a heat exchange member; and
   opening a turbine bypass valve fluidically connected to the HRSG when the throttle and control valve is closed to substantially prevent an over pressure condition in the EGR system.

9. The method of claim 8, wherein, extracting the second fluid from the substantially oxygen free portion of the compressed fluid flow comprises extracting nitrogen from the substantially oxygen free portion of the compressed airflow.

10. The method of claim 8, further comprising: guiding the substantially oxygen free portion of the compressed airflow through a blow-out when the throttle and control valve is closed.

11. The method of claim 8, wherein passing the substantially oxygen free portion of the compressed fluid flow from one of the compressor outlet and the head end of the combustor comprises extracting the substantially oxygen free portion of the compressed fluid flow from the head end of the combustor.

12. The method of claim 8, further comprising: operating the combined cycle power plant at stoichiometric conditions.

* * * * *